United States Patent [19]

Zürbig

[11] Patent Number: 4,529,627
[45] Date of Patent: Jul. 16, 1985

[54] METHOD OF COATING OF GLASS ARTICLES WITH TITANIUM OXIDE

[75] Inventor: Jürgen Zürbig, Essen, Fed. Rep. of Germany

[73] Assignee: Veba-Glas AG, Essen, Fed. Rep. of Germany

[21] Appl. No.: 514,764

[22] Filed: Jul. 18, 1983

[30] Foreign Application Priority Data

Jul. 17, 1982 [DE] Fed. Rep. of Germany ....... 3226900

[51] Int. Cl.³ .................. C23C 11/00; C23C 13/00
[52] U.S. Cl. .................. 427/255; 427/255.3; 427/314; 65/60.51
[58] Field of Search ............ 427/255, 314, 255.2, 427/255.3; 65/60.51

[56] References Cited

U.S. PATENT DOCUMENTS

| | | | |
|---|---|---|---|
| 3,353,514 | 11/1967 | Lyle | 427/255 |
| 3,438,803 | 4/1969 | Dubble et al. | 427/255 |
| 3,516,811 | 6/1970 | Gatchet et al. | 427/255 |
| 3,658,304 | 4/1972 | Hall et al. | 427/255 |
| 3,827,870 | 8/1974 | Fogelberg et al. | 427/255 |
| 3,952,118 | 4/1976 | Novice | 427/255 |
| 4,431,692 | 2/1984 | Hofman et al. | 427/255 |

*Primary Examiner*—Sadie L. Childs
*Attorney, Agent, or Firm*—Karl F. Ross; Herbert Dubno

[57] ABSTRACT

Dry air is passed as a carrier gas through a supply vessel containing titanium chloride at a pressure between 0.1 and 3 bar, the resulting reaction mixture being admitted through nozzles into a tunnel traversed by hot glass containers whose mouths project into a mouth compartment of the tunnel which is separately evacuated so that, as titanium oxide is formed on the glass surfaces, the mouths of the containers can remain free of the deposit.

4 Claims, 2 Drawing Figures

METHOD OF COATING OF GLASS ARTICLES WITH TITANIUM OXIDE

FIELD OF THE INVENTION

My present invention relates to a method of coating of glass articles with titanium oxide and, more particularly, to the coating of hot glass articles with a reaction system capable of forming titanium oxide in situ upon the glass so as to render the glass surface less susceptible to scratching and other marring which may affect the strength of the container.

BACKGROUND OF THE INVENTION

Freshly cast or otherwise shaped glass articles are particularly sensitive to scratching which may be detrimental to the strength of the wall of the container.

To avoid this negative effect, it is customary to treat the surface of the freshly made glass article with a coating of a metal oxide, for example, which tends to inhibit scratching and, put otherwise, protectively coats the glass surface.

In general, the metal oxide has been applied to the glass containers while they are at temperatures above about 400° C. having been formed immediately prior to the coating process and without reheating the glass articles. The metals which are used are tin and titanium since these have high affinity to the molecular structure of the glass and form oxides readily on the glass surfaces.

The coating with titanium oxides generally utilizes titanium in the form of its chloride and is carried out in a tunnel-like structure through which the glass containers pass and into which the titanium chloride reactant is introduced to decompose and form titanium oxide on the glass surface. The reaction takes place by contact of the titanium chloride with this surface and the titanium oxide precipitates readily thereon.

While there are various processes and devices for ensuring the contact of the reactant with the glass which have been considered to provide good effects, they have various disadvantages which complicate the production of the coated glass articles.

For example, there is a tendency toward condensation and there is some tendency to premature reaction of the reactant gases in the supply pipes of the apparatus, leading to deposits which partially or completely obstruct the flow passages.

Another problem arises in the form of a limitation in the coating efficiency in certain of the prior art techniques. In yet other cases, difficulties are encountered with the coating of the mouth of the glass vessel which complicate the application of metallic closures or create corrosion problems with such metallic closures or so modify the friction that such closures may tend to rotate when such rotation is not desirable.

In some cases, conventional apparatus has had to deal with problems resulting from the fact that the glass containers tend to fall transversely or to stack up and pack within the treatment chamber thereby requiring removal by hand and other expensive procedures.

OBJECT OF THE INVENTION

It is, therefore, the principal object of the present invention to provide an improved method of coating glass articles whereby the disadvantages previously mentioned are avoided and, more particularly, uniform thickness coatings can be applied to the glass articles over substantially all of the outer surfaces thereof except in the region of the mouth thereof.

SUMMARY OF THE INVENTION

These objects and others which will become apparent hereinafter are attained, in accordance with the invention, in which the hot glass containers, having their mouths turned upwardly, i.e. in an upright orientation, are passed through a tunnel advantageously provided with a conveyor and are subjected within the space within this tunnel which is maintained at a subatmospheric pressure, to contact with titanium chloride compounds.

According to a method aspect of the invention, therefore, the articles are coated by contacting them with the titanium chloride reactant in a mixture formed by providing the titanium chloride in a closed vessel which is maintained under a subatmospheric pressure and into which dry air is admitted as a carrier gas for the titanium chloride vapor, the gas mixture being introduced at a temperature of up to 50° C. into the treatment chamber.

This completely eliminates any possibility of condensation of the reaction gas and thus precludes blockage of the products.

The pressure in the mixing or supply vessel for the titanium chloride vapor can be 0.1 to 3.0 bar (usually more than 0.3 bar) and preferably the dry carrier air is supplied with the titanium chloride vapor to a level close to its saturation point.

The temperature at which the mixture is formed can be ambient temperature or less and in any case should not exceed 50° C.

The gas mixture is introduced into the coating chamber by means of nozzles and the coating chamber is maintained under subatmospheric pressure so that excess reactant and the reaction product can be conducted away. The rate at which the reactant and carrier gas mixture is supplied and the rate at which the gases are drawn from the chamber are such that a laminar flow is maintained therein.

According to another aspect of the invention, the apparatus comprises the tunnel through which the containers are displaced by the conveyor and along the longitudinal sides of which the nozzles are oriented. The nozzles are positioned to ensure contact of the mixture with the glass containers on the sides of the latter and the nozzles can have partially slit-like and partially tubular and circular outlets. The outlets or orifices have dimensions as required for the volume rates of flow for the articles treated. The orientation of these nozzles should be such that they provide largely a laminar flow so that there are few if any vortices or any other turbulence in the region of contact between the reaction gases and the hot containers.

The coating chamber is connected to a suction source maintaining the desired laminar flow and carrying off the reaction products and excess reactants.

Advantageously, the tunnel is formed at its upper region with a so-called mouth compartment into which the mouths of the containers project and which can be also connected to a suction source but which is not provided with inlets for the reaction gases. Any reaction gases entering this compartment can be carried off immediately, thereby excluding deposits on the mouths of the containers.

Along the path of the articles, i.e. longitudinally of the tunnel and disposed laterally of the path, spaced-apart sensors of a mechanical, optical, electrical or electronic type can be provided to detect deviations of the articles from the path. Upon the development of such deviations, the reaction gas flow is immediately interrupted and the entire housing structure can be automatically lifted by electrical, mechanical, hydraulic or pneumatic means. The container which has created the problem can thereby be carried off by the conveyor without causing a blockage. Release of the reaction gases into the environment is precluded and hence the system can operate without environmental hazard. The titanium chloride compound which is used is preferably a titanium tetrachloride.

One of the advantages of the system of the invention is that the glass articles to be coated need not be as hot as has previously been considered to be the case and indeed temperatures of slightly above 300° C. can be utilized which means that even cooled containers can be coated after being heated up to such temperatures.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
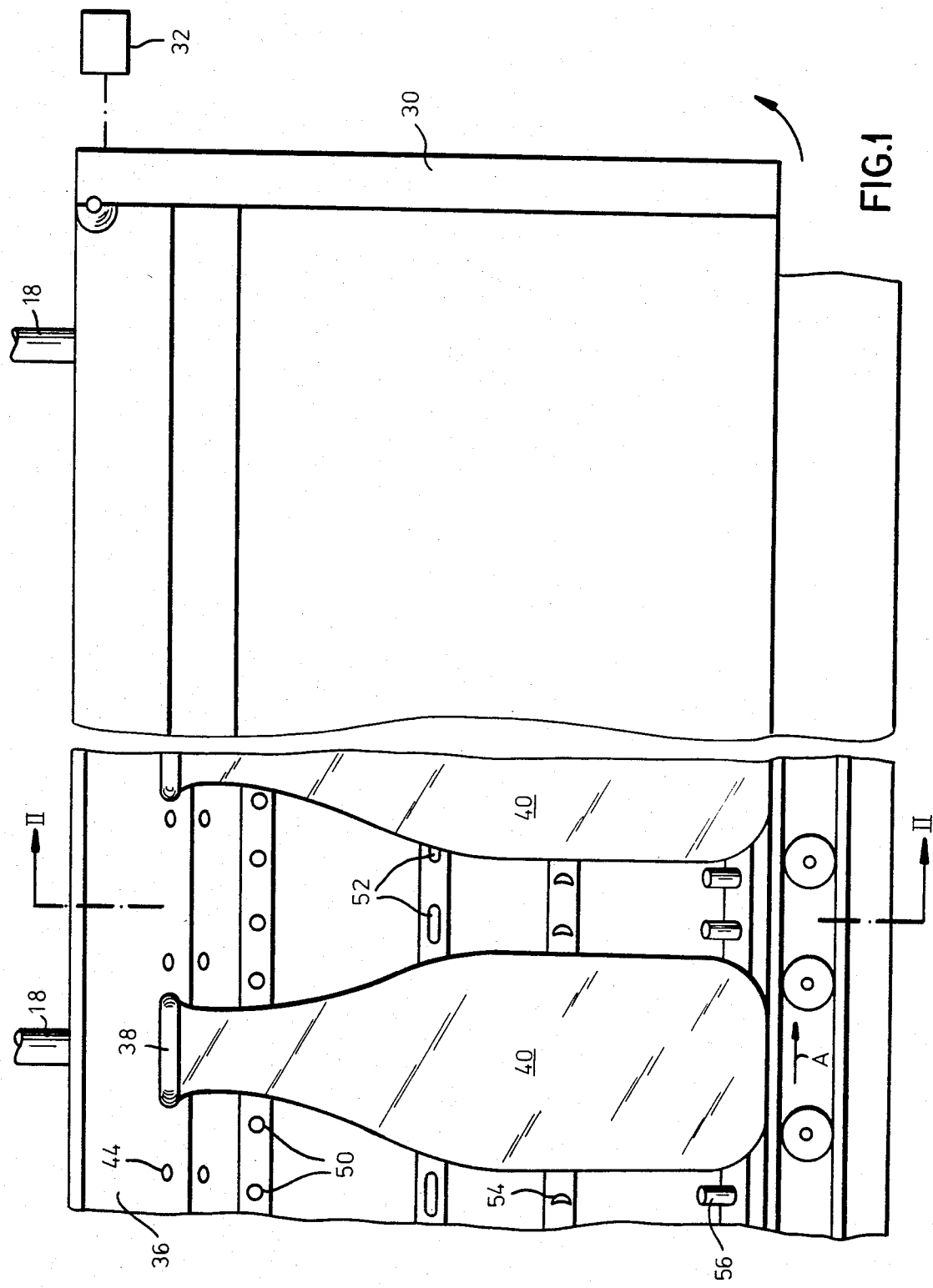
FIG. 1 is a side elevational view of a portion of a coating chamber according to the invention, partly broken away.
Figure 2:
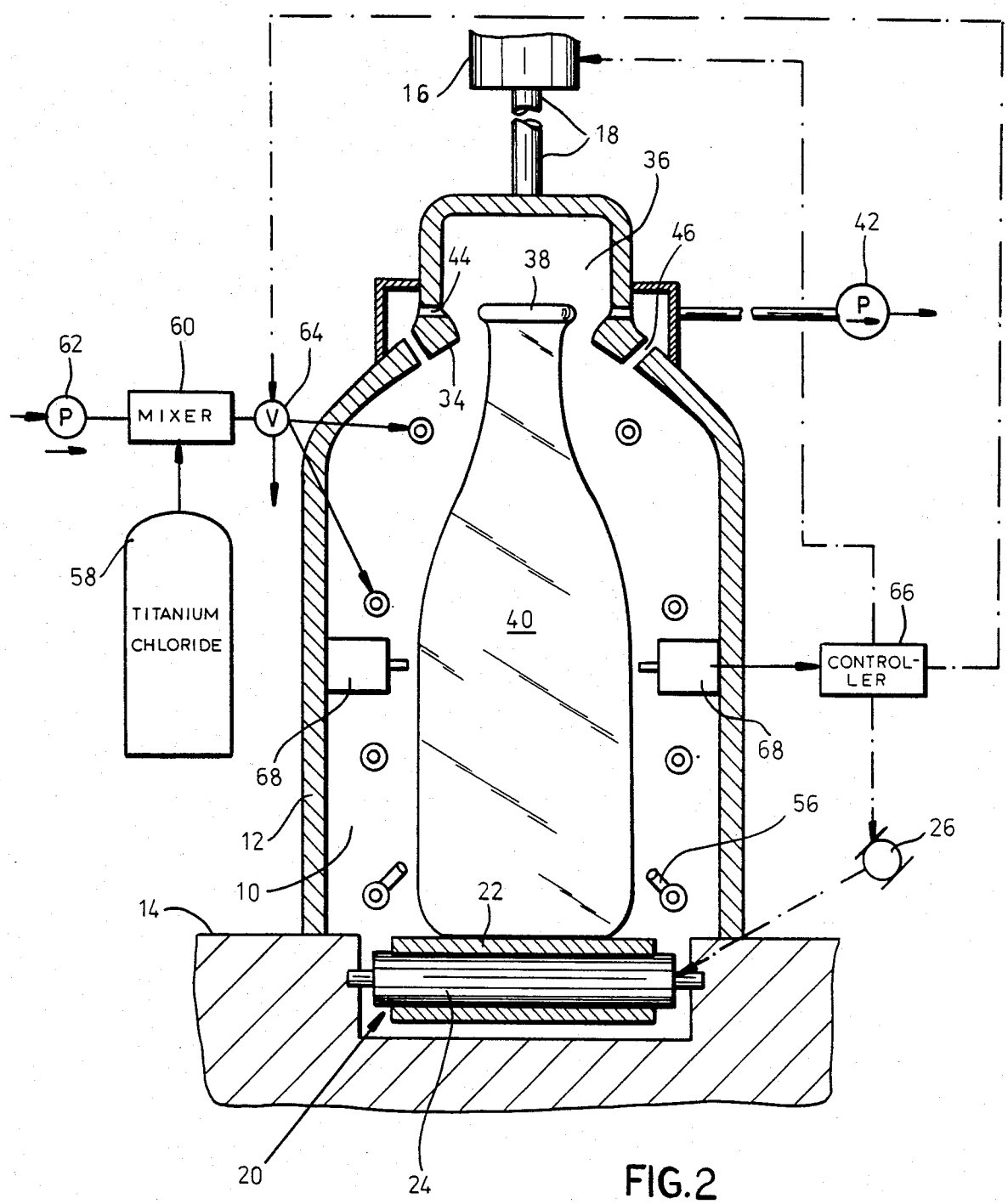
FIG. 2 is a section taken along the line II—II of FIG. 1.

In the drawing, which diagrammatically shows an apparatus for carrying out the method of the present invention, it will be apparent that the treatment chamber 10 is defined by a tunnel-shaped structure 12 which can be raised from and lowered onto a base 14 by an automatic raising and lowering mechanism represented by the pneumatic cylinders of which one is shown at 16 and the piston rods 18.

The base 14 is provided with a conveyor 20 having a belt 22 riding on rolls 24 and driven by a motor 26. The tunnel is closed at its opposite ends by appropriate doors, e.g. a door 30 operated by the actuator 32, or vacuum locks which enable the articles to pass through. Otherwise the inlet door at the left-hand end may be opened to allow a number of articles to be introduced, then closed for the treatment and the right-hand door opened for exchange of the articles.

The tunnel 12 is formed with a pair of inwardly extending ridges 34 which separate the treatment chamber 10 from a mouth compartment 36 in which the mouths 38 of the containers 40 project. The mouth compartment is evacuated, e.g. by a suction source 42 via ports 44, so that the reaction gases do not deposit the titanium oxide on the mouth of the container. Other outlets 46 are provided so that the suction pump 42 can maintain a subatmospheric pressure in the treatment chamber 10 and enable the excess reaction gases and the reaction products to be drawn off.

Extending longitudinally along the tunnel are pipes 48 with discharge orifices oriented and shaped to maintain a laminar flow of the reaction mixture on all surfaces of the containers within the treatment chamber. For example, the orifices 50 may be circular while the orifices 52 are longer and extended longitudinally in the direction of travel A of the bottle. Other orifices may be elongated as shown at 54 and can lie vertically while still other orifices 56 may be tubular.

The pipes 48 are supplied with the reaction gases from a pressure vessel 58, from a mixer 50 through which dry air is passed by a blower or pump 62. A valve 64 can be operated by the controller 66 when sensors 68, e.g. sensitive switches, detect a disorientation of one of the bottles to terminate the flow of the reaction gases into a device.

Simultaneously, the controller 66 operates the cylinder 16 to raise the tunnel and, if desired, drives the motor 26 so as to carry off the disoriented container. The lifting of the tunnel prevents stacking up of bottles behind the falling container.

The titanium chloride gas, in admixture with the dry air, passes uniformly over the hot surface of the bottles to precipitate titanium oxide on all of the surfaces with the exception of those in the mouth compartment 36 in the manner previously described.

I claim:

1. A method of coating glass articles with titanium oxide which comprises the steps of:
    heating said glass articles to a temperature above ambient room temperature;
    providing titanium chloride in a closed supply vessel;
    passing a dry air as a carrier gas through said vessel to substantially completely saturate said carrier gas with titanium chloride at a temperature of at most ambient room temperature, said vessel being maintained at a pressure of substantially 0.1 to 3 bar, thereby forming a reaction gas mixture; and
    contacting said heated glass articles with said mixture in a laminar flow to cause decomposition of the titanium chloride and deposition of titanium oxide on the articles.

2. The method defined in claim 1 wherein said containers are passed through a tunnel forming said chamber and are vertically elongated to have mouths at the upper ends of said containers, said mouths being received in a compartment extending along said tunnel and separated from said chamber, gas being evacuated from said compartment adjacent said mouths and said carrier gas saturated with titanium chloride being introduced into said tunnel along the path of said containers all around said containers.

3. The method of coating a hot surface of a glass container with titanium oxide as defined in claim 1 which comprises the steps of:
    disposing said container in a substantially tunnel-shaped coating chamber;
    evacuating said chamber to a subatmospheric pressure; and
    contacting said container in said chamber at said subatmospheric pressure with said carrier gas saturated with titanium chloride from said vessel at the temperature at which said carrier gas is saturated with titanium chloride, thereby decomposing said compound and forming titanium oxide in situ on said container.

4. The method defined in claim 3 wherein said mixture is introduced into said chamber through nozzles.

* * * * *